United States Patent
Ho et al.

(10) Patent No.: US 9,570,937 B2
(45) Date of Patent: *Feb. 14, 2017

(54) WIRELESS POWER TRANSMISSION DEVICE

(71) Applicant: Primax Electronics Ltd., Neihu, Taipei (TW)

(72) Inventors: Yung-Hsien Ho, Taipei (TW); Hung-Wei Chiu, Taipei (TW); Chun-Hao Lo, Taipei (TW)

(73) Assignee: PRIMAX ELECTRONICS LTD., Taipei (TW)

(*) Notice: Subject to any disclaimer, the term of this patent is extended or adjusted under 35 U.S.C. 154(b) by 148 days.

This patent is subject to a terminal disclaimer.

(21) Appl. No.: 14/557,145

(22) Filed: Dec. 1, 2014

(65) Prior Publication Data

US 2016/0099599 A1   Apr. 7, 2016

(30) Foreign Application Priority Data

Oct. 3, 2014   (TW) .............................. 103134630 A (51) Int. Cl.
*H02J 7/02*   (2016.01)
*H02J 7/00*   (2006.01)

(52) U.S. Cl.
CPC ................ *H02J 7/025* (2013.01); *H02J 7/007* (2013.01)

(58) Field of Classification Search
CPC .................................. H02J 5/005; H02J 7/025
USPC ......................................................... 320/108
See application file for complete search history.

(56) References Cited

U.S. PATENT DOCUMENTS

2014/0375258 A1* 12/2014 Arkhipenkov .......... H02J 7/025
                                                        320/108

* cited by examiner

*Primary Examiner* — Drew A Dunn
*Assistant Examiner* — Sailesh Thapa
(74) *Attorney, Agent, or Firm* — Kirton McConkie; Evan R. Witt (57) ABSTRACT

A wireless power transmission device includes a main body, a first transmitter coil and a second transmitter coil. The second transmitter coil is stacked over the first transmitter coil. If the wireless power transmission device is operated in a detecting mode, a magnetic flux is generated by the first transmitter coil and oriented in the direction toward the top surface of the main body. The magnetic flux is attenuated by the overlying second transmitter coil. Consequently, the electromagnetic wave is inhibited. If the wireless power transmission device is operated in a charging mode, both the first transmitter coil and the second transmitter coil are controlled to transmit magnetic fluxes. Since the intensity of the electric power is increased, the charging efficiency is enhanced.

6 Claims, 5 Drawing Sheets

WIRELESS POWER TRANSMISSION DEVICE

FIELD OF THE INVENTION

The present invention relates to a power transmission device, and more particularly to a wireless power transmission device utilizing a wireless charging technology.

BACKGROUND OF THE INVENTION

Conventionally, most electronic devices should be connected with power sources to acquire electric power in order to be normally operated. Generally, all of these electronic devices may be plugged into corresponding power sources (for example power sockets) to acquire the electric power through power cables. With increasing development of science and technology, a variety of electronic devices are developed toward small size, light weightiness and easy portability in order to comply with the users' requirements. Although the electronic device can be easily carried, the electronic device cannot be connected with the power source to acquire the electric power through the power cable at any time. Generally, a built-in chargeable battery is usually installed in the electronic device for providing sufficient electric power to the electronic device.

For example, in case that the electricity quantity of the chargeable battery of the electronic device is insufficient, the chargeable battery of the electronic device may be charged by a charging device. In this context, the charging device is also referred as a power transmission device. Generally, the conventional power transmission device has a connecting wire. After the connecting wire is plugged into the electronic device and the conventional power transmission device is connected with the power source, the electric power may be transmitted from the power transmission device to the electronic device through the connecting wire. However, the applications of the power transmission device during the charging process are usually restricted by the connecting wire. For example, since the length of the connecting wire of the power transmission device is limited, the electronic device cannot be operated according to the usual practice or the electronic device cannot be arbitrarily moved. On the other hand, if the conventional power transmission device has been repeatedly used to charge the electronic device for a long term, the connector of the connecting wire of the power transmission device is readily damaged because the connector of the connecting wire is frequently plugged into and removed from the electronic device. Under this circumstance, the charging efficiency of the connecting wire of the power transmission device is deteriorated. If the connector is seriously damaged, the charging task fails to be done through the connecting wire.

Figure 1:
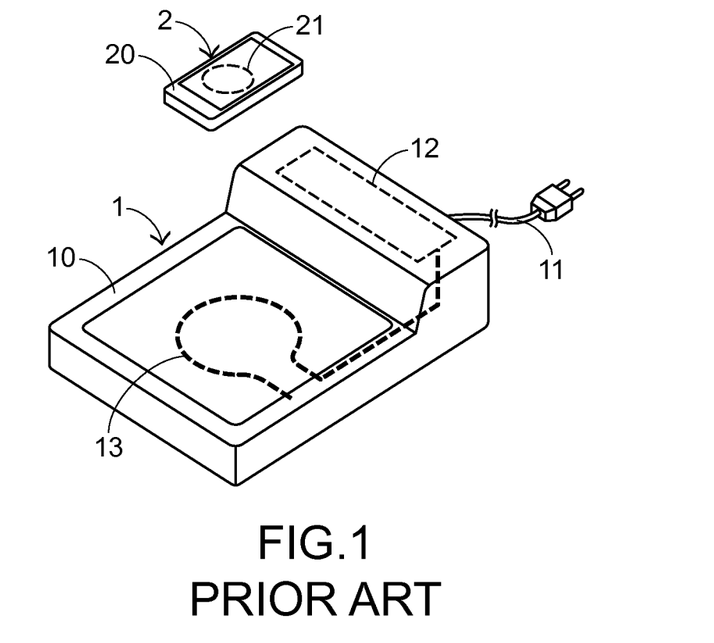
FIG. 1 schematically illustrates the relationship between a conventional wireless power transmission device and a conventional electronic device.

With increasing development of a wireless charging technology, a wireless power transmission device for wirelessly charging the electronic device has been introduced into a market in order to solve the drawbacks of using the connecting wire by the wired charging technology. FIG. 1 schematically illustrates the relationship between a conventional wireless power transmission device and a conventional electronic device. As shown in FIG. 1, the conventional wireless power transmission device 1 comprises a main body 10, a power cable 11, a driving circuit 12, and a transmitter coil 13. In addition, the conventional electronic device 2 comprises a casing 20, a receiver coil 21, and a chargeable battery (not shown).

In the conventional wireless power transmission device 1, the power cable 11 is exposed outside the main body 10 in order to be connected with a power source (not shown). Both of the driving circuit 12 and the transmitter coil 13 are disposed within the casing 10. Moreover, the driving circuit 12 is connected with the power cable 11 and the transmitter coil 13. When the driving circuit 12 is driven by the power source, a voltage is provided to the driving circuit 12 and thus an electric current is generated by the driving circuit 12. When the electric current flows through the transmitter coil 13, an electromagnetic effect is generated. According to the electromagnetic effect, a magnetic flux is generated by the transmitter coil 13. In the conventional electronic device 2, the receiver coil 21 is disposed within the casing 20 for receiving the magnetic flux from the transmitter coil 13, so that the magnetic flux is converted into an electric power. The chargeable battery is connected with the receiver coil 21 for storing and utilizing the electric power which is received by the receiver coil 21.

For achieving a power-saving purpose, the conventional wireless power transmission device 1 may be selectively operated in a charging mode or a detecting mode. When the conventional wireless power transmission device 1 is operated in the charging mode, the above charging process is performed and not redundantly described herein. When the conventional wireless power transmission device 1 is operated in the detecting mode, the conventional wireless power transmission device 1 is electrically conducted to periodically generate the electromagnetic effect at a predetermined time interval (e.g. 100 ms) according to predetermined settings. Moreover, in the detecting mode, the conventional wireless power transmission device 1 judges whether the conventional electronic device 2 to be charged is placed on the main body 10 by detecting whether a communication signal is transmitted from the receiver coil 21 of the conventional electronic device 2. If the conventional wireless power transmission device 1 judges that the conventional electronic device 2 to be charged is placed on the main body 10, the operating mode of the conventional wireless power transmission device 1 is switched from the detecting mode to the charging mode. Under this circumstance, the conventional wireless power transmission device 1 charges the conventional electronic device 2 without the need of saving the electric power.

However, if the conventional wireless power transmission device 1 is operated in the detecting mode and the conventional electronic device 2 is not placed on the main body 10, some drawbacks may occur. Since no object is placed on the main body 10 to absorb the magnetic flux which is generated by the electromagnetic effect and the generated energy in a short time period is very large, the electromagnetic wave is scatted everywhere by radiation. As known, the scattered electromagnetic wave not only influences the electronic device but also hurts the user's body.

Therefore, there is a need of providing a wireless power transmission device for avoiding the generation of the scattered electromagnetic wave.

SUMMARY OF THE INVENTION

The present invention provides a wireless power transmission device for avoiding the generation of the scattered electromagnetic wave.

In accordance with an aspect of the present invention, there is provided a wireless power transmission device for wirelessly charging an electronic device. The wireless power transmission device includes a main body, a driving circuit, a first transmitter coil, and a second transmitter coil. The driving circuit is disposed within the main body, and provides a first voltage or a second voltage. The first transmitter coil is disposed within the main body and connected with the driving circuit. The second transmitter coil is disposed within the main body and connected with the driving circuit. The second transmitter coil is stacked over the first transmitter coil. If the wireless power transmission device is operated in a detecting mode, the driving circuit periodically provides the first voltage to the first transmitter coil at a first predetermined time interval, so that a first magnetic flux is generated by the first transmitter coil and the first magnetic flux is attenuated by the second transmitter coil. The attenuated first magnetic flux is periodically outputted from the wireless power transmission device at the first predetermined time interval. If the wireless power transmission device is operated in a charging mode, the driving circuit provides the second voltage to the first transmitter coil and the second transmitter coil, wherein according to the second voltage, a second magnetic flux is generated by the first transmitter coil and a third magnetic flux is generated by the second transmitter coil, so that the second magnetic flux and the third magnetic flux are transmitted from the wireless power transmission device to a receiver coil of the electronic device.

In accordance with another aspect of the present invention, there is provided a wireless power transmission device for wirelessly charging an electronic device. The wireless power transmission device includes a main body, a driving circuit, a first transmitter coil, and a second transmitter coil. The driving circuit is disposed within the main body, and provides a first voltage, a second voltage or a third voltage. The first transmitter coil is disposed within the main body and connected with the driving circuit. The second transmitter coil is disposed within the main body and connected with the driving circuit. The second transmitter coil is stacked over the first transmitter coil. If the wireless power transmission device is operated in a detecting mode, the driving circuit periodically provides the first voltage to the first transmitter coil at a first predetermined time interval, and the driving circuit periodically provides the second voltage to the second transmitter coil at the first predetermined time interval, so that a first magnetic flux is generated by the first transmitter coil and a second magnetic flux is generated by the second transmitter coil. A direction of the second magnetic flux is opposite to a direction of the first magnetic flux, so that the first magnetic flux is attenuated. The attenuated first magnetic flux is periodically outputted from the wireless power transmission device at the first predetermined time. If the wireless power transmission device is operated in a charging mode, the driving circuit provides the third voltage to the first transmitter coil and the second magnetic flux. According to the third voltage, a third magnetic flux is generated by the first transmitter coil and a fourth magnetic flux is generated by the second transmitter coil, so that the second magnetic flux and the third magnetic flux are transmitted from the wireless power transmission device to a receiver coil of the electronic device.

From the above descriptions, the wireless power transmission device of the present invention comprises two transmitter coils, wherein one transmitter coil is stacked over the other transmitter coil. In case that the wireless power transmission device is in the detecting mode, the magnetic flux generated by the underlying first transmitter coil is transmitted to the top surface of the main body, and the magnetic flux is attenuated by the overlying second transmitter coil. Consequently, the energy of the electromagnetic wave is reduced, and the influence of the electromagnetic wave on the health of the human body will be minimized. In case that the wireless power transmission device is operated in the charging mode, both the first transmitter coil and the second transmitter coil are controlled to transmit magnetic fluxes. Since the intensity of the electric power is increased, the charging efficiency is enhanced.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For solving the drawbacks of the conventional technologies, the present invention provides a wireless power transmission device.

Figure 2:
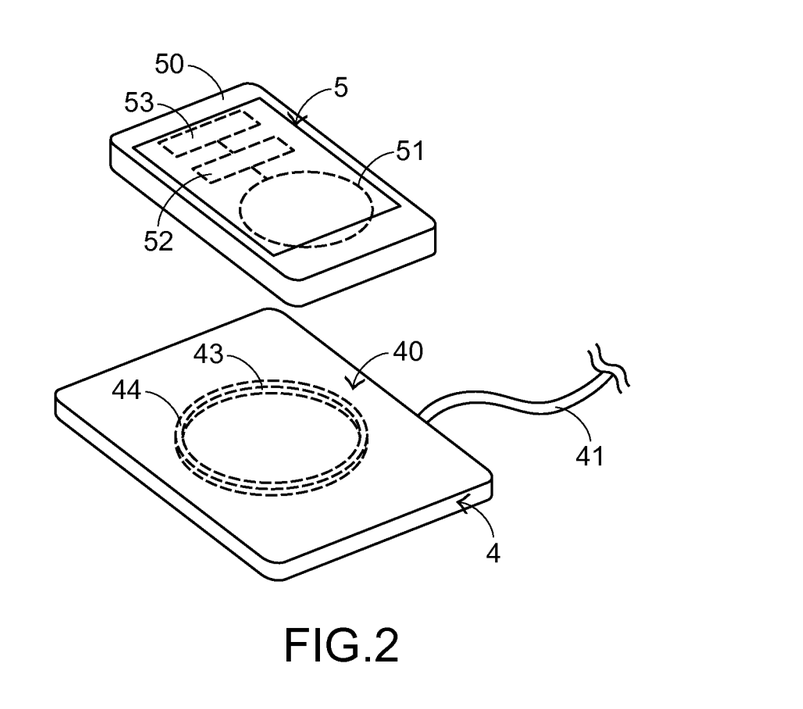
FIG. 2 schematically illustrates the relationship between an electronic device and a wireless power transmission device according to a first embodiment of the present invention.
Figure 3:
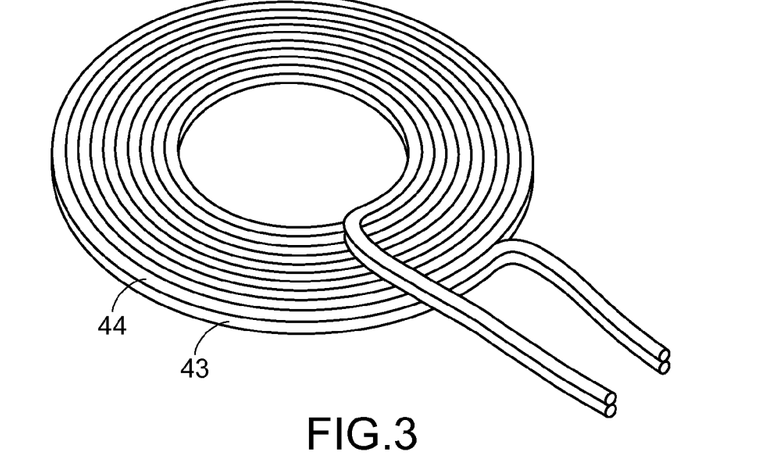
FIG. 3 schematically illustrates a first transmitter coil and a second transmitter coil of the wireless power transmission device according to the first embodiment of the present invention.
Figure 4:
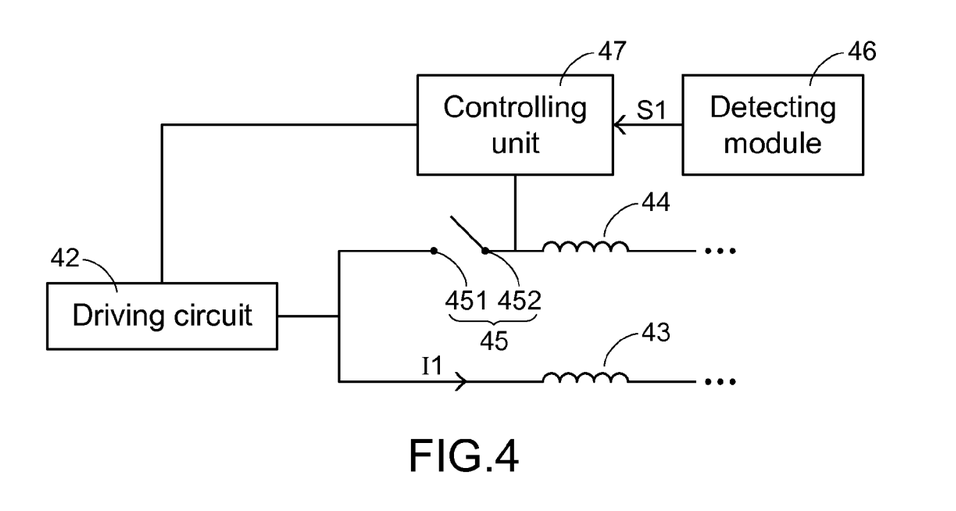
FIG. 4 is a schematic functional block diagram illustrating the first transmitter coil and the second transmitter coil of the wireless power transmission device in a detecting mode according to the first embodiment of the present invention.

Please refer to FIGS. 2, 3 and 4. FIG. 2 schematically illustrates the relationship between an electronic device and a wireless power transmission device according to a first embodiment of the present invention. FIG. 3 schematically illustrates a first transmitter coil and a second transmitter coil of the wireless power transmission device according to the first embodiment of the present invention. FIG. 4 is a schematic functional block diagram illustrating the first transmitter coil and the second transmitter coil of the wireless power transmission device in a detecting mode according to the first embodiment of the present invention. In FIG. 2, the wireless power transmission device 4 and the electronic device 5 are shown. Moreover, the wireless power transmission device 4 comprises a main body 40, a power cable 41, a driving circuit 42 (see FIG. S4), a first transmitter coil 43, a second transmitter coil 44, a switching element 45 (see FIG. 4), a detecting module 46 (see FIG. 4) and a controlling unit 47 (see FIG. 4). The power cable 41 of the wireless power transmission device 4 is exposed outside the main body 40. The power cable 41 is connected with a power source for acquiring an electric power from the power source. The driving circuit 42 is disposed within the main body 40 for providing a first voltage or a second voltage. The first transmitter coil 43 is disposed within the main body 40, and connected with the driving circuit 42. A first electromagnetic effect is generated according to the first voltage provided by the driving circuit 42. A second electromagnetic effect is generated according to the second voltage provided by the driving circuit 42. Moreover, a first magnetic flux is generated by the first transmitter coil 43 according to the first electromagnetic effect, or a second magnetic flux is generated by the first transmitter coil 43 according to the second electromagnetic effect. In this embodiment, the main body 40 of the wireless power transmission device 4 is designed to have a platform profile.

As shown in FIG. 3, the second transmitter coil 44 is disposed within the main body 40 and connected with the driving circuit 42. Moreover, the second transmitter coil 44 is stacked over the first transmitter coil 43. The second transmitter coil 44 has two functions. Firstly, a third electromagnetic effect is generated according to the second voltage provided by the driving circuit 42. According to the third electromagnetic effect, a third magnetic flux is generated by the second transmitter coil 44. Secondly, the first magnetic flux which is generated by the first transmitter coil 43 may be attenuated by the second transmitter coil 44.

In this embodiment, the first transmitter coil 43 and the second transmitter coil 44 are wound to have the same shape. Moreover, the second transmitter coil 44 is stacked over and completely overlapped with the first transmitter coil 43. In this embodiment, both of the first transmitter coil 43 and the second transmitter coil 44 are wound to have a circular shape. Alternatively, in another embodiment, the first transmitter coil and the second transmitter coil are wound to have different shapes. For example, the first transmitter coil and the second transmitter coil are wound to have a circular shape and a rectangular shape, respectively.

Please refer to FIGS. 2, 3 and 4 again. The switching element 45 is disposed within the main body 40. An input terminal 451 of the switching element 45 is connected to the driving circuit 42. An output terminal 452 of the switching element 45 is connected to the second transmitter coil 44. The detecting module 46 is disposed within the main body 40 for detecting whether the electronic device 5 is placed on the main body 40. The controlling unit 47 is connected with the detecting module 46 and the switching element 45. According to the signal outputted from the detecting module 46, the operations of the switching element 45 and the driving circuit 42 are controlled by the controlling unit 47. In this embodiment, the switching element 45 is a branch switch, the detecting module 46 is a decoder, and the controlling unit 47 is a microprocessor.

Moreover, the electronic device 5 comprises a casing 50, a receiver coil 51, a converting circuit 52 and a chargeable battery 53. The receiver coil 51 is covered by the casing 50. When the casing 50 is placed on the main body 40 of the wireless power transmission device 4, the receiver coil 51 may receive the first magnetic flux or the second magnetic flux which is generated by the first transmitter coil 43, and issue a communication signal. The communication signal contains a wireless communication protocol information. The converting circuit 52 is disposed within the casing 50, and connected with the receiver coil 51 and the chargeable battery 53. The converting circuit 52 is used for converting the corresponding magnetic flux into an electric power E. The chargeable battery 53 is disposed within the casing 50, and connected with the receiver coil 51. The electric power E from the converting circuit 52 may be stored in the chargeable battery 53. In this embodiment, the electronic device 5 is a mobile phone, and the receiver coil 51 is wound to have a circular shape (not shown). Alternatively, in another embodiment, the receiver coil may be wound to have an elliptic shape or any other appropriate shape.

Figure 5:
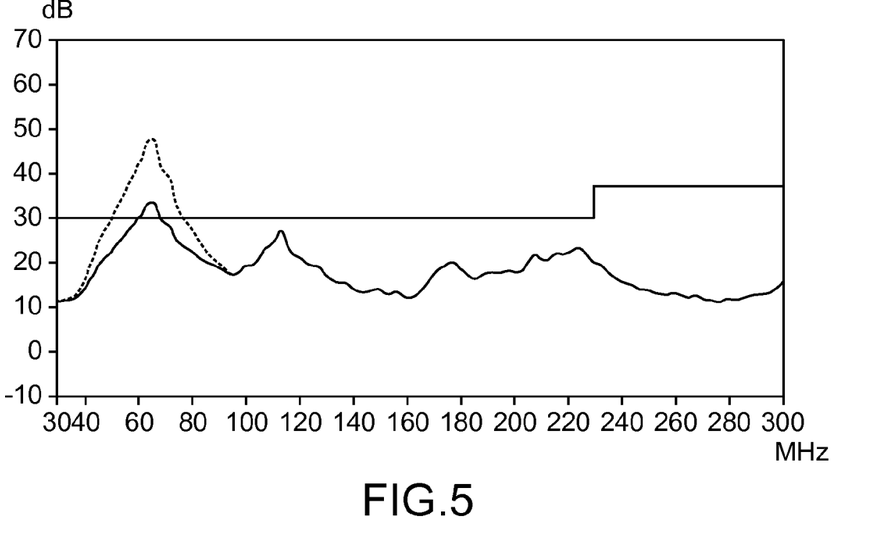
FIG. 5 is a plot illustrating the relationship between the magnetic flux and the frequency of the wireless power transmission device in the detecting mode according to the first embodiment of the present invention.

Hereinafter, the operations of the wireless power transmission device 4 will be illustrated with reference to FIGS. 2, 3, 4 and 5. FIG. 5 is a plot illustrating the relationship between the magnetic flux and the frequency of the wireless power transmission device in the detecting mode according to the first embodiment of the present invention. When the user intends to wirelessly charge the electronic device 5, the power cable 41 of the wireless power transmission device 4 is firstly connected with the power source, so that the wireless power transmission device 4 is enabled. According to the predetermined settings, the wireless power transmission device 4 is operated in the detecting mode after the wireless power transmission device 4 is enabled. In the detecting mode, the detecting module 46 issues a first switching signal S1 to the controlling unit 47. According to the first switching signal S1, the controlling unit 47 controls the output terminal 452 and the input terminal 451 of the switching element 45 to disconnect from each other. Moreover, the controlling unit 47 controls the driving circuit 42 to periodically provide the first voltage to the first transmitter coil 43 at a first predetermined time interval (e.g. 500 ms), and thus a first current I1 is generated. When the first current I1 flows through the first transmitter coil 43, the first electromagnetic effect is generated. According to the first electromagnetic effect, the first magnetic flux is generated by the first transmitter coil 43. The first magnetic flux is oriented in a direction toward a top surface of the main body 40 where the electronic device 5 is placed.

On the other hand, if the controlling unit 47 controls the driving circuit 42 to provide no voltage to the second transmitter coil 44, no current flows through the second transmitter coil 44. Under this circumstance, no electromagnetic effect is generated. Since the second transmitter coil 44 is stacked over the first transmitter coil 43, the first transmitter coil 43 is sheltered by the second transmitter coil 44. Under this circumstance, a part of the first magnetic flux is blocked by the second transmitter coil 44, and thus the first magnetic flux is attenuated. Consequently, as shown in FIG. 5, the attenuated first magnetic flux is periodically outputted from power transmission device 4 at the first predetermined time interval.

At this moment, the electronic device 5 is still not placed on the main body 40, and thus no communication signal from the receiver coil 51 is received by the detecting module 46. Then, the detecting module 46 may wait for a second predetermined time interval (e.g. 5 seconds) to receive the communication signal. If the communication signal is still not received by the detecting module 46 within the second predetermined time interval, the wireless power transmission device 4 is continuously operated in the detecting mode and the attenuated first magnetic flux is periodically outputted from power transmission device 4 at the first predetermined time interval. In FIG. 5, the magnetic flux indicated by dotted line is the first magnetic flux which is not attenuated by the second transmitter coil 44. The intensity of the first magnetic flux is higher than the intensity of the attenuated first magnetic flux.

Figure 6:
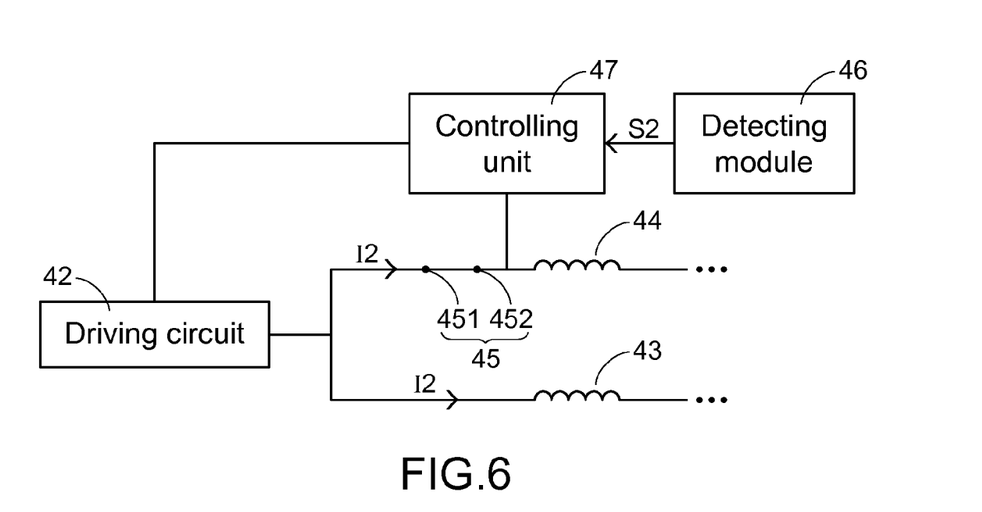
FIG. 6 is a schematic functional block diagram illustrating the first transmitter coil and the second transmitter coil of the wireless power transmission device in a charging mode according to the first embodiment of the present invention.

Please refer to FIGS. 2, 3, 4 and 6. FIG. 6 is a schematic functional block diagram illustrating the first transmitter coil and the second transmitter coil of the wireless power transmission device in a charging mode according to the first embodiment of the present invention. In case that the electronic device 5 is placed on the top surface of the main body 40, the attenuated first magnetic flux is received by the receiver coil 51 of the electronic device 5. Consequently, a communication signal is transmitted from the receiver coil 51 to the first transmitter coil 43. After the communication signal is received by the detecting module 46, the detecting module 46 issues a second switching signal S2 to the controlling unit 47. According to the second switching signal S2, the controlling unit 47 controls the output terminal 452 and the input terminal 451 of the switching element 45 to connect with each other. Meanwhile, the first transmitter coil 43 and the second transmitter coil 44 are connected with each other in parallel. Moreover, according to the second switching signal S2, the controlling unit 47 controls the driving circuit 42 to provide the second voltage to the first transmitter coil 43 and the second transmitter coil 44. Moreover, the magnitude of the second voltage is lower than the magnitude of the first voltage.

Figure 7:
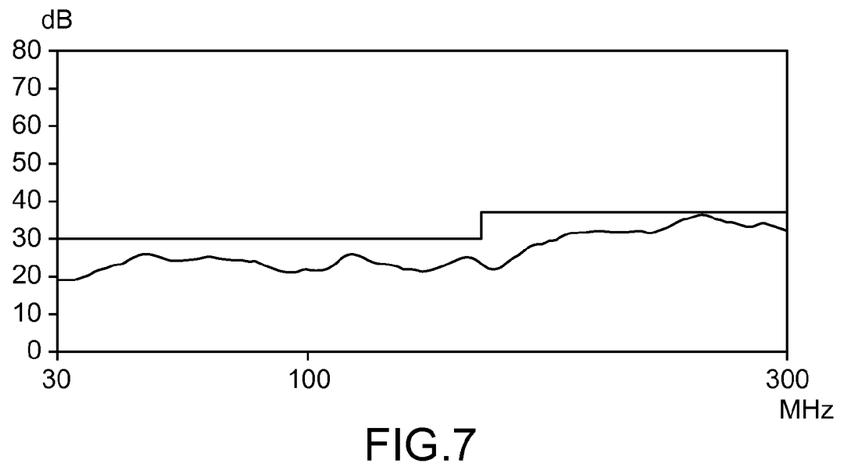
FIG. 7 is a plot illustrating the relationship between the magnetic flux and the frequency of the wireless power transmission device in the charging mode according to the first embodiment of the present invention.

According to the second voltage, a second current I2 is generated. When the second current I2 flows through the first transmitter coil 43, the second electromagnetic effect is generated. According to the second electromagnetic effect, the second magnetic flux is generated by the first transmitter coil 43. The second magnetic flux is oriented in the direction toward the top surface of the main body 40. Similarly, when the second current I2 generated according to the second voltage flows through the second transmitter coil 44, the third electromagnetic effect is generated. According to the third electromagnetic effect, the third magnetic flux is generated by the second transmitter coil 44. The third magnetic flux is also oriented in the direction toward the top surface of the main body 40. Consequently, the second magnetic flux and the third magnetic flux are transmitted from the wireless power transmission device 4 to the receiver coil 51. The second magnetic flux and the third magnetic flux are converted into an electric power E by the converting circuit 52. The electric power E is transmitted to the chargeable battery 53 in order to wireless charge the electronic device 5. During the charging process, the relationship between the magnetic flux and the frequency of the wireless power transmission device may be depicted by the plot of FIG. 7.

From the above descriptions about the first embodiment, when the wireless power transmission device 4 is operated in the detecting mode, only the first transmitter coil 43 is controlled to generate the first magnetic flux. At the same time, the first transmitter coil 43 is sheltered by the second transmitter coil 44, which is stacked over the first transmitter coil 43. Under this circumstance, the first magnetic flux is attenuated, and thus the scatted electromagnetic wave is inhibited. When the wireless power transmission device 4 is operated in the charging mode, the first transmitter coil 43 is controlled to generate the second magnetic flux and the second transmitter coil 44 is controlled to generate the third magnetic flux. Due to the synergistic effect of the second magnetic flux and the third magnetic flux, the charging efficiency is enhanced.

Figure 8:
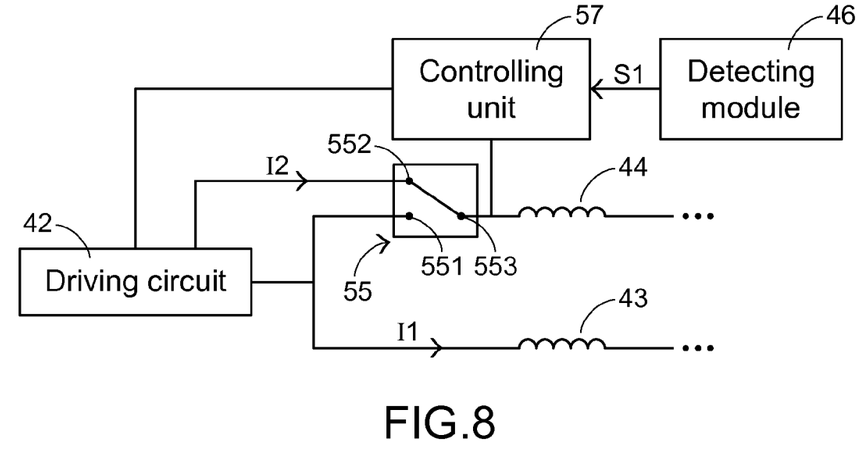
FIG. 8 is a schematic functional block diagram illustrating a first transmitter coil and a second transmitter coil of a wireless power transmission device in a detecting mode according to a second embodiment of the present invention.

The present invention further provides a second embodiment, which is distinguished from the first embodiment. FIG. 8 is a schematic functional block diagram illustrating a first transmitter coil and a second transmitter coil of a wireless power transmission device in a detecting mode according to a second embodiment of the present invention. Please refer to FIGS. 2 and 8. This embodiment will be illustrated by also referring to the wireless power transmission device 4 and the electronic device 5 as shown in FIG. 2. The wireless power transmission device 4 comprises a main body 40, a power cable 41, a driving circuit 42, a first transmitter coil 43, a second transmitter coil 44, a switching element 55, a detecting module 46 and a controlling unit 57. The components similar to those of the wireless power transmission device 4 of first embodiment are designated by identical numeral references, and detailed description thereof is omitted.

In comparison with the first embodiment, the following two aspects are distinguished. Firstly, the switching element 55 of the wireless power transmission device 4 of this embodiment is a multiplexer. Moreover, the switching element 55 comprises a first input terminal 551, a second input terminal 552 and an output terminal 553. The first input terminal 551 is connected to the driving circuit 42. The second input terminal 552 is also connected to the driving circuit 42. The output terminal 553 is connected to the second transmitter coil 44. Secondly, the operations of the controlling unit 57 are different from the operations of the controlling unit 47 of the first embodiment. The operations of the controlling unit 57 will be illustrated later.

Hereinafter, the operations of the wireless power transmission device 4 will be illustrated with reference to FIGS. 2 and 8. When the user intends to wirelessly charge the electronic device 5, the power cable 41 of the wireless power transmission device 4 is firstly connected with the power source, so that the wireless power transmission device 4 is enabled. After the wireless power transmission device 4 is enabled, the wireless power transmission device 4 is operated in the detecting mode. In the detecting mode, the detecting module 46 issues a first switching signal S1 to the controlling unit 57. According to the first switching signal S1, the controlling unit 57 controls the output terminal 553 and the second input terminal 552 of the switching element 55 to connect with each other. Moreover, the controlling unit 57 controls the driving circuit 42 to periodically provide the first voltage to the first transmitter coil 43 at a first predetermined time interval, and thus a first current I1 is generated. When the first current I1 flows through the first transmitter coil 43, a first electromagnetic effect is generated. According to the first electromagnetic effect, a first magnetic flux is generated by the first transmitter coil 43. The first magnetic flux is oriented in a direction toward a top surface of the main body 40 where the electronic device 5 is placed.

Figure 9:
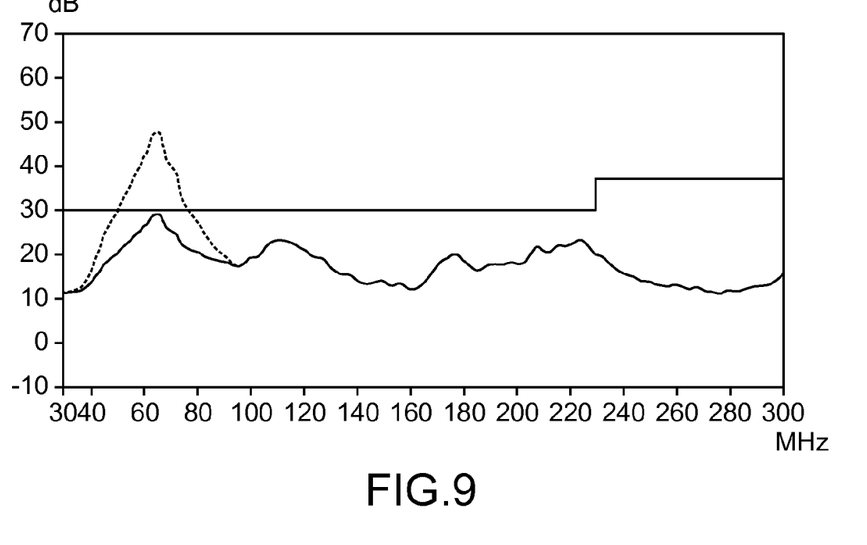
FIG. 9 is a plot illustrating the relationship between the magnetic flux and the frequency of the wireless power transmission device in the charging mode according to the second embodiment of the present invention.

At the same time, the controlling unit 57 also controls the driving circuit 42 to periodically provide the second voltage to the second transmitter coil 44 at the first predetermined time interval, and thus a second current I2 is generated. When the second current I2 flows through the second transmitter coil 44, a second electromagnetic effect is generated. According to the second electromagnetic effect, a second magnetic flux is generated by the second transmitter coil 44. Since the direction of the second magnetic flux is opposite to the direction of the first magnetic flux, the first magnetic flux is attenuated. The second voltage and the first voltage are out of phase, and the magnitude of the first voltage is higher than the magnitude of the second voltage. Consequently, as shown in FIG. 9, the attenuated first magnetic flux is periodically outputted from power transmission device 4 at the first predetermined time interval.

At this moment, the electronic device 5 is still not placed on the main body 40, and thus no communication signal from the receiver coil 51 is received by the detecting module 46. Then, the detecting module 46 may wait for a second predetermined time interval to receive the communication signal. If the communication signal is still not received by the detecting module 46 within the second predetermined time interval, the wireless power transmission device 4 is continuously operated in the detecting mode and the attenuated first magnetic flux is periodically outputted from power transmission device 4 at the first predetermined time interval. In FIG. 9, the magnetic flux indicated by dotted line is the first magnetic flux which is not attenuated by the second transmitter coil 44. The intensity of the first magnetic flux is higher than the intensity of the attenuated first magnetic flux.

Figure 10:
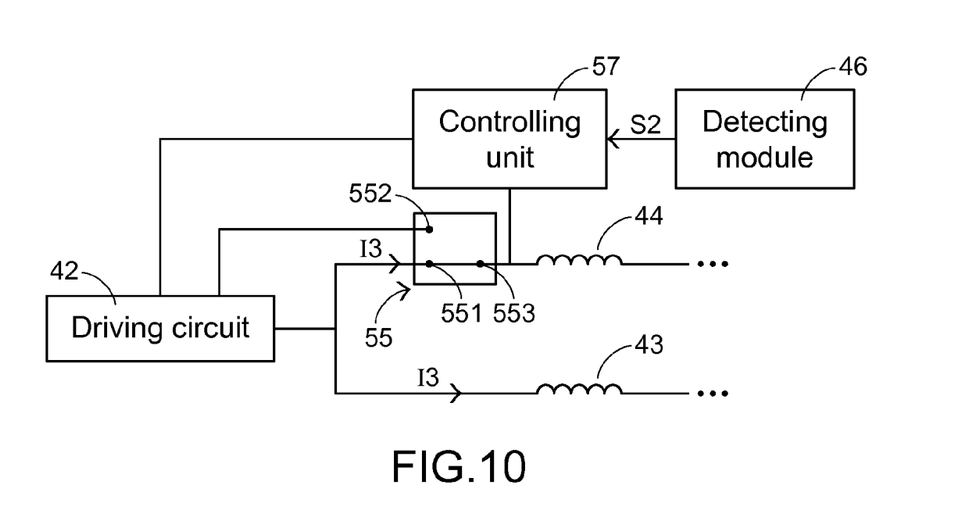
FIG. 10 is a schematic functional block diagram illustrating the first transmitter coil and the second transmitter coil of the wireless power transmission device in a charging mode according to the second embodiment of the present invention.

FIG. 10 is a schematic functional block diagram illustrating the first transmitter coil and the second transmitter coil of the wireless power transmission device in a charging mode according to a second embodiment of the present invention. Please refer to FIGS. 2 and 10. In case that the electronic device 5 is placed on the top surface of the main body 40, the attenuated first magnetic flux is received by the receiver coil 51 of the electronic device 5. Consequently, a communication signal is transmitted from the receiver coil 51 to the first transmitter coil 43. After the communication signal is received by the detecting module 46, the detecting module 46 issues a second switching signal S2 to the controlling unit 57. According to the second switching signal S2, the controlling unit 57 controls the output terminal 553 and the first input terminal 551 of the switching element 55 to connect with each other. Meanwhile, the first transmitter coil 43 and the second transmitter coil 44 are connected with each other in parallel. Moreover, according to the second switching signal S2, the controlling unit 57 controls the driving circuit 42 to provide the third voltage to the first transmitter coil 43 and the second transmitter coil 44. Since the magnitude of the third voltage is lower than the magnitude of the first voltage, the intensity of the first magnetic flux is lower than the intensity of the third magnetic flux.

According to the third voltage, a third current 13 is generated. When the third current 13 flows through the first transmitter coil 43, the third electromagnetic effect is generated. According to the third electromagnetic effect, the third magnetic flux is generated by the first transmitter coil 43. The third magnetic flux is oriented in the direction toward the top surface of the main body 40. Similarly, when the third current 13 generated according to the third voltage flows through the second transmitter coil 44, a fourth electromagnetic effect is generated. According to the fourth electromagnetic effect, a fourth magnetic flux is generated by the second transmitter coil 44. The fourth magnetic flux is also oriented in the direction toward the top surface of the main body 40. Consequently, the third magnetic flux and the fourth magnetic flux are transmitted from the wireless power transmission device 4 to the receiver coil 51. The third magnetic flux and the fourth magnetic flux are converted into an electric power by the converting circuit 52. The electric power is transmitted to the chargeable battery 53 in order to wireless charge the electronic device 5.

From the above descriptions about the first embodiment, when the wireless power transmission device 4 is operated in the detecting mode, the first transmitter coil 43 is controlled to generate the first magnetic flux and the second transmitter coil 44 is controlled to generate the second magnetic flux, wherein the direction of the second magnetic flux is opposite to the direction of the first magnetic flux. Under this circumstance, the first magnetic flux is attenuated, and thus the scatted electromagnetic wave is inhibited. When the wireless power transmission device 4 is operated in the charging mode, the first transmitter coil 43 is controlled to generate the third magnetic flux and the second transmitter coil 44 is controlled to generate the fourth magnetic flux. Due to the synergistic effect of the third magnetic flux and the fourth magnetic flux, the charging efficiency is enhanced.

From the above descriptions, the wireless power transmission device of the present invention comprises two transmitter coils, wherein one transmitter coil is stacked over the other transmitter coil. In case that the wireless power transmission device is in the detecting mode, the magnetic flux generated by the underlying first transmitter coil is transmitted to the top surface of the main body, and the magnetic flux is attenuated by the overlying second transmitter coil. Consequently, the energy of the electromagnetic wave is reduced, and the influence of the electromagnetic wave on the health of the human body will be minimized. In case that the wireless power transmission device is operated in the charging mode, both the first transmitter coil and the second transmitter coil are controlled to transmit magnetic fluxes. Since the intensity of the electric power is increased, the charging efficiency is enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A wireless power transmission device for wirelessly charging an electronic device, the wireless power transmission device comprising:
    a main body;
    a driving circuit disposed within the main body, and providing a first voltage or a second voltage;
    a first transmitter coil disposed within the main body and connected with the driving circuit;
    a second transmitter coil disposed within the main body and connected with the driving circuit, wherein the second transmitter coil is stacked over the first transmitter coil; and
    a switching element, wherein an input terminal of the switching element is connected to the driving circuit, and an output terminal of the switching element is connected to the second transmitter coil,
    wherein if the wireless power transmission device is operated in a detecting mode, the driving circuit periodically provides the first voltage to the first transmitter coil at a first predetermined time interval, so that a first magnetic flux is generated by the first transmitter coil and the first magnetic flux is attenuated by the second transmitter coil, wherein the attenuated first magnetic flux is periodically outputted from the wireless power transmission device at the first predetermined time interval, wherein if the wireless power transmission device is operated in a charging mode, the driving circuit provides the second voltage to the first transmitter coil and the second transmitter coil, wherein according to the second voltage, a second magnetic flux is generated by the first transmitter coil and a third magnetic flux is generated by the second transmitter coil, so that the second magnetic flux and the third magnetic flux are transmitted from the wireless power transmission device to a receiver coil of the electronic device, wherein if the wireless power transmission device is operated in the charging mode, the first transmitter coil and the second transmitter coil are connected with each other in parallel, wherein if the wireless power transmission device is operated in the detecting mode, the output terminal and the input terminal of the switching element are disconnected from each other, and the driving circuit periodically provides the first voltage at the first predetermined time interval to generate a first current, wherein when the first current flows through the first transmitter coil, a first electromagnetic effect is generated, and a first magnetic flux is generated by the first transmitter coil according to the first electromagnetic effect, wherein the first transmitter coil is sheltered by the second transmitter coil, so that the first magnetic flux is attenuated, wherein the attenuated first magnetic flux is periodically outputted from the wireless power transmission device at the first predetermined time interval, wherein if the wireless power transmission device is operated in the charging mode, the output terminal and input terminal of the switching element are connected with each other, so that first transmitter coil and the second transmitter coil are connected with each other in parallel, and the driving circuit provides the second voltage to generate a second current, wherein when the second current flows through the first transmitter coil and the second transmitter coil, a second electromagnetic effect and a third electromagnetic effect are generated, wherein the second magnetic flux is generated by the first transmitter coil according to the second electromagnetic effect, and the third magnetic flux is generated by the second transmitter coil according to the third electromagnetic effect, so that the second magnetic flux and the third magnetic flux are transmitted from the wireless power transmission device to the receiver coil.

2. The wireless power transmission device according to claim 1, further comprising:

a detecting module disposed within the main body, and detecting whether the electronic device is placed on the main body; and a controlling unit connected with the detecting module, the switching element and the driving circuit, wherein if the electronic device is not placed on the main body and no communication signal from the receiver coil is received by the detecting module within a second predetermined time interval, a first switching signal is transmitted from the detecting module to the controlling unit, wherein according to the first switching signal, the controlling unit controls the output terminal and the input terminal of the switching element to be disconnected from each other, and the controlling unit controls the driving circuit to periodically provide the first voltage to the first transmitter coil at the first predetermined time interval, wherein if the electronic device is placed on the main body and a communication signal from the receiver coil is received by the detecting module, a second switching signal is transmitted from the detecting module to the controlling unit, wherein according to the second switching signal, the controlling unit controls the output terminal and the input terminal of the switching element to be connected with each other, and the controlling unit controls the driving circuit to provide the second voltage to the first transmitter coil and the second transmitter coil.

3. A wireless power transmission device for wirelessly charging an electronic device, the wireless power transmission device comprising:

a main body;

a driving circuit disposed within the main body, and providing a first voltage, a second voltage or a third voltage;

a first transmitter coil disposed within the main body and connected with the driving circuit;

a second transmitter coil disposed within the main body and connected with the driving circuit, wherein the second transmitter coil is stacked over the first transmitter coil; and a switching element, wherein a first input terminal of the switching element is connected to the driving circuit, a second input terminal of the switching element is connected to the driving circuit, and an output terminal of the switching element is connected to the second transmitter coil, wherein if the wireless power transmission device is operated in a detecting mode, the driving circuit periodically provides the first voltage to the first transmitter coil at a first predetermined time interval, and the driving circuit periodically provides the second voltage to the second transmitter coil at the first predetermined time interval, so that a first magnetic flux is generated by the first transmitter coil and a second magnetic flux is generated by the second transmitter coil, wherein a direction of the second magnetic flux is opposite to a direction of the first magnetic flux, so that the first magnetic flux is attenuated, wherein the attenuated first magnetic flux is periodically outputted from the wireless power transmission device at the first predetermined time, wherein if the wireless power transmission device is operated in a charging mode, the driving circuit provides the third voltage to the first transmitter coil and the second transmitter coil, wherein according to the third voltage, a third magnetic flux is generated by the first transmitter coil and a fourth magnetic flux is generated by the second transmitter coil, so that the third magnetic flux and the fourth magnetic flux are transmitted from the wireless power transmission device to a receiver coil of the electronic device, wherein if the wireless power transmission device is operated in the detecting mode, the output terminal and the second input terminal of the switching element are connected with each other, the driving circuit periodically provides the first voltage to the first transmitter coil at the first predetermined time interval so as to generate a first current, and the driving circuit periodically provides the second voltage to the second transmitter coil at the first predetermined time interval so as to generate a second current, wherein when the first current flows through the first transmitter coil, a first electromagnetic effect is generated, and the first magnetic flux is generated by the first transmitter coil according to the first electromagnetic effect, wherein when the second current flows through the second transmitter coil, a second electromagnetic effect is generated, and the second magnetic flux is generated by the second transmitter coil according to the second electromagnetic effect, wherein the direction of the second magnetic flux is opposite to the direction of the first magnetic flux is periodically outputted from the wireless power transmission device at the first predetermined time, wherein if the wireless power transmission device is operated in the charging mode, the output terminal and the first input terminal of the switching element are connected with each other, so that first transmitter coil and the second transmitter coil are connected with each other in parallel, and the driving circuit provides the third voltage so as to generate a third current, wherein when the third current flows through the first transmitter coil and the second transmitter coil, the third magnetic flux is generated by the first transmitter coil, and the fourth magnetic flux is generated by the second transmitter coil, so that the third magnetic flux and the fourth magnetic flux are transmitted from the wireless power transmission device to the receiver coil.

4. The wireless power transmission device according to claim 3, wherein if the wireless power transmission device is operated in the charging mode, the first transmitter coil and the second transmitter coil are connected with each other in parallel.

5. The wireless power transmission device according to claim 3, wherein a magnitude of the first voltage provided by the driving circuit is higher than a magnitude of the second voltage provided by the driving circuit, the magnitude of the first voltage is higher than a magnitude of the third voltage, and an intensity of the first magnetic flux is higher than an intensity of an intensity of the third magnetic flux, wherein the second voltage and the first voltage are out of phase.

6. The wireless power transmission device according to claim 3, further comprising:
 a detecting module disposed within the main body, and detecting whether the electronic device is placed on the main body; and
 a controlling unit connected with the detecting module, the switching element and the driving circuit,
 wherein if the electronic device is not placed on the main body and no communication signal from the receiver coil is received by the detecting module within a second predetermined time interval, a first switching signal is transmitted from the detecting module to the controlling unit, wherein according to the first switching signal, the controlling unit controls the output terminal and the second input terminal of the switching element to be connected with each other, the controlling unit controls the driving circuit to periodically provide the first voltage at the first predetermined time interval so as to generate the first current to the first transmitter coil, and the controlling unit controls the driving circuit to periodically provide the second voltage at the first predetermined time interval so as to generate the second current to the second transmitter coil,
 wherein if the electronic device is placed on the main body and a communication signal from the receiver coil is received by the detecting module, a second switching signal is transmitted from the detecting module to the controlling unit, wherein according to the second switching signal, the controlling unit controls the output terminal and the first input terminal of the switching element to be connected with each other, and the controlling unit controls the driving circuit to provide the third voltage so as to generate the third current to the first transmitter coil and the second transmitter coil.

\* \* \* \* \*